US011101958B2

(12) United States Patent
Hong

(10) Patent No.: US 11,101,958 B2
(45) Date of Patent: Aug. 24, 2021

(54) METHOD AND DEVICE FOR SIGNALING TRANSMISSION

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 39 days.

(21) Appl. No.: 16/608,863

(22) PCT Filed: Apr. 27, 2017

(86) PCT No.: PCT/CN2017/082188
§ 371 (c)(1),
(2) Date: Oct. 27, 2019

(87) PCT Pub. No.: WO2018/195855
PCT Pub. Date: Nov. 1, 2018

(65) Prior Publication Data
US 2021/0119750 A1    Apr. 22, 2021

(51) Int. Cl.
*H04W 4/70* (2018.01)
*H04W 8/24* (2009.01)
*H04W 36/08* (2009.01)
*H04W 72/04* (2009.01)
*H04L 5/00* (2006.01)

(52) U.S. Cl.
CPC ............ *H04L 5/0051* (2013.01); *H04W 4/70* (2018.02); *H04W 8/24* (2013.01); *H04W 36/08* (2013.01); *H04W 72/0413* (2013.01)

(58) Field of Classification Search
None
See application file for complete search history.

(56) References Cited

U.S. PATENT DOCUMENTS 10,390,266 B2 * 8/2019 Won ............... H04W 36/00837
10,812,983 B2 * 10/2020 Yeo .................. H04L 5/0048
10,880,787 B2 * 12/2020 Trang ............... H04W 36/0061
(Continued)

FOREIGN PATENT DOCUMENTS

CN    101984649 A    3/2011
CN    102204315 A    9/2011
(Continued)

OTHER PUBLICATIONS

International Search Report in PCT/CN2017/082188 dated Nov. 2, 2017.
(Continued)

*Primary Examiner* — Kenny S Lin
(74) *Attorney, Agent, or Firm* — Syncoda LLC; Feng Ma

(57) ABSTRACT

A method for signaling transmission includes: receiving a control signaling transmitted by a target 5G base station, where the target 5G base station is a 5G base station being accessed by a target terminal, the target terminal is a terminal used for managing and controlling a target NB-IoT device, and the target NB-IoT device is an NB-IoT device having accessed the NB-IoT base station; and transmitting the control signaling to the target NB-IoT device so as to allow the target NB-IoT device to execute a corresponding operation on the basis of the control signaling.

17 Claims, 13 Drawing Sheets

(56) References Cited

U.S. PATENT DOCUMENTS

| | | | |
|---|---|---|---|
| 2017/0155703 A1* | 6/2017 | Hao | H04L 67/12 |
| 2017/0273011 A1* | 9/2017 | Rico Alvarino | H04W 4/70 |
| 2018/0132293 A1* | 5/2018 | Escott | H04W 36/0055 |
| 2018/0376417 A1* | 12/2018 | Wang | H04L 67/12 |
| 2019/0014561 A1* | 1/2019 | Takeda | H04L 5/0094 |
| 2019/0020455 A1* | 1/2019 | Yamamoto | H04L 1/1861 |
| 2019/0020998 A1* | 1/2019 | Takahashi | H04W 76/20 |
| 2019/0274150 A1* | 9/2019 | Huang | H04W 52/265 |

FOREIGN PATENT DOCUMENTS

| | | | |
|---|---|---|---|
| CN | 103379154 A | 10/2013 | |
| CN | 106131076 A | 11/2016 | |
| CN | 106408836 A | 2/2017 | |
| CN | 106549841 A | 3/2017 | |
| EP | 2906004 A4 | 9/2015 | |
| WO | 2016193415 A1 | 12/2016 | |
| WO | 2018010820 A1 | 1/2018 | |

OTHER PUBLICATIONS

1st Office Action in CN 201780000267.2 dated Apr. 21, 2020.
Extended European Search Report in EP17907931.4 dated Apr. 3, 2020.
3rd Generation Partnership Project; Technical Specification Group Services and System Aspects; 3GPP TR23.720; Mar. 2016.
India 1st Office Action in Application No. 201927047913, dated Feb. 1, 2021.

* cited by examiner

METHOD AND DEVICE FOR SIGNALING TRANSMISSION

CROSS-REFERENCE TO RELATED APPLICATION

The application is a national stage of International Application No. PCT/CN2017/082188 filed on Apr. 27, 2017, the disclosure of which is incorporated herein by reference in its entirety.

TECHNICAL FIELD

The present disclosure relates to the field of communications technologies, and more particularly, to a method and an apparatus for signaling transmission.

BACKGROUND

NR (New Radio) network correlation standardization (i.e., 5G) is being carried out in 3GPP (3rd Generation Partnership Project). In a 5G system, NB-IOT (Narrow Band Internet of Things) technologies are defined. NB-IOT is constructed on a cellular network and only consumes bandwidth of about 180 KHz. It may be directly deployed in a GSM (Global System for Mobile Communication) network, a UMTS (Universal Mobile Telecommunications System) network, or an LTE (Long Term Evolution) network to reduce deployment costs and achieve smooth upgrades.

Accordingly, there also emerged a large number of devices in which the NB-IOT technologies are used, namely NB-IOT devices, such as smart meters, smart printers, smart health medical devices, and so on. However, solutions for transmitting to the NB-IOT devices a control signaling used by terminals to manage and control the NB-IOT devices have not be provided yet until now.

SUMMARY

In order to overcome problems in related technologies, embodiments of the present disclosure provide a method and an apparatus for signaling transmission.

According to a first aspect of the embodiments of the present disclosure, there is provided a method for signaling transmission. The method is applied to a cellular-based Narrow Band Internet of Things (NB-IOT) base station and includes:

receiving a control signaling transmitted by a target 5G base station, wherein the target 5G base station is a 5G base station accessed by a target terminal, the target terminal is a terminal configured to manage and control a target NB-IOT device, and the target NB-IOT device is an NB-IOT device accessing the NB-IOT base station; and transmitting the control signaling to the target NB-IOT device, causing the target NB-IOT device to execute a corresponding operation according to the control signaling.

Optionally, the receiving a control signaling transmitted by a target 5G base station includes:

receiving, through a base station interface between the NB-IOT base station and the target 5G base station, the control signaling transmitted by the target 5G base station.

Optionally, the receiving a control signaling transmitted by a target 5G base station includes:

receiving the control signaling forwarded by a network side and transmitted by the target 5G base station to the network side.

Optionally, before the receiving a control signaling transmitted by a target 5G base station, the method further includes:

receiving first device information reported by the target NB-IOT device after accessing the NB-IOT base station, wherein the first device information is device information of the target NB-IOT device; and determining the target 5G base station according to the first device information.

Optionally, the determining the target 5G base station according to the first device information includes:

interacting with a 5G base station through a base station interface between the NB-IOT base station and the 5G base station, and comparing second device information received by the 5G base station with the first device information, wherein the second device information is device information, transmitted by a terminal accessing the 5G base station to the 5G base station, of an NB-IOT device currently required to be managed and controlled by the terminal; and determining a 5G base station corresponding to the second device information matching with the first device information as the target 5G base station.

Optionally, the determining the target 5G base station according to the first device information includes:

reporting the first device information to a network side, causing the network side to compare, after receiving second device information reported by a 5G base station, the first device information with the second device information, wherein the second device information is device information, transmitted by a terminal accessing the 5G base station to the 5G base station, of an NB-IOT device currently required to be managed and controlled by the terminal;

receiving a 5G base station identifier transmitted by the network side, wherein the 5G base station identifier is a base station identifier of the 5G base station corresponding to the second device information matching with the first device information; and determining a 5G base station indicated by the 5G base station identifier as the target 5G base station.

According to a second aspect of the embodiments of the present disclosure, there is provided a method for signaling transmission. The method is applied to a 5G base station and includes:

receiving a control signaling reported by a target terminal accessing the 5G base station for managing and controlling a target NB-IOT device; and transmitting the control signaling to a target NB-IOT base station, causing the target NB-IOT base station to forward the control signaling to the target NB-IOT device, thereby causing the target NB-IOT device to perform an operation corresponding to the control signaling; wherein the target NB-IOT base station is an NB-IOT base station accessed by the target NB-IOT device.

Optionally, the transmitting the control signaling to a target NB-IOT base station includes:

transmitting the control signaling to the target NB-IOT base station through a base station interface between the 5G base station itself and the target NB-IOT base station.

Optionally, the transmitting the control signaling to a target NB-IOT base station includes:

transmitting the control signaling to a network side, causing the network side to forward the control signaling to the target NB-IOT base station.

Optionally, before the receiving a control signaling reported by a target terminal accessing the 5G base station for managing and controlling a target NB-IOT device, the method further includes:

receiving second device information transmitted by the target terminal to the 5G base station, wherein the second device information is device information of the target NB-IOT device currently required to be managed and controlled by the target terminal; and determining the target NB-IOT base station according to the second device information.

Optionally, the determining the target NB-IOT base station according to the second device information includes:

performing information interaction through a base station interface between the 5G base station and an NB-IOT base station, and comparing first device information received by the NB-IOT base station with the second device information, wherein the first device information is device information of an NB-IOT device reported by the NB-IOT device accessing the NB-IOT base station; and determining an NB-IOT base station corresponding to the first device information matching with the second device information as the target NB-IOT base station.

Optionally, the determining the target NB-IOT base station according to the second device information includes:

reporting the second device information to a network side, causing the network device to compare, after receiving first device information reported by the NB-IOT base station, the first device information with the second device information, wherein the first device information is device information of an NB-IOT device reported by the NB-IOT device accessing the NB-IOT base station;

receiving an NB-IOT base station identifier transmitted by the network side, wherein the NB-IOT base station identifier is a base station identifier of an NB-IOT base station corresponding to the first device information matching with the second device information; and determining the NB-IOT base station indicated by the NB-IOT base station identifier as the target NB-IOT base station.

According to a third aspect of the embodiments of the present disclosure, there is provided an apparatus for signaling transmission. The apparatus is applied to a cellular-based Narrow Band Internet of Things (NB-IOT) base station and includes:

a first receiving module, configured to receive a control signaling transmitted by a target 5G base station, wherein the target 5G base station is a 5G base station accessed by a target terminal, the target terminal is a terminal configured to manage and control a target NB-IOT device, and the target NB-IOT device is an NB-IOT device accessing the NB-IOT base station; and a first transmitting module, configured to transmit the control signaling to the target NB-IOT device, causing the target NB-IOT device to execute a corresponding operation according to the control signaling.

Optionally, the first receiving module includes:

a first receiving submodule, configured to receive, through a base station interface between the NB-IOT base station and the target 5G base station, the control signaling transmitted by the target 5G base station.

Optionally, the first receiving module includes:

a second receiving submodule, configured to receive the control signaling forwarded by a network side and transmitted by the target 5G base station to the network side.

Optionally, the apparatus further includes:

a second receiving module, configured to receive first device information reported by the target NB-IOT device after accessing the NB-IOT base station, wherein the first device information is device information of the target NB-IOT device; and a first base station determining module, configured to determine the target 5G base station according to the first device information.

Optionally, the first base station determining module includes:

a first matching submodule, configured to interact with a 5G base station through a base station interface between the NB-IOT base station and the 5G base station, and compare second device information received by the 5G base station with the first device information, wherein the second device information is device information, transmitted by a terminal accessing the 5G base station to the 5G base station, of an NB-IOT device currently required to be managed and controlled by the terminal; and a first determining submodule, configured to determine a 5G base station corresponding to the second device information matching with the first device information as the target 5G base station.

Optionally, the first base station determining module includes:

a first reporting submodule, configured to report the first device information to a network side, causing the network side to compare, after receiving second device information reported by a 5G base station, the first device information with the second device information, wherein the second device information is device information, transmitted by a terminal accessing the 5G base station to the 5G base station, of an NB-IOT device currently required to be managed and controlled by the terminal;

a third receiving submodule, configured to receive a 5G base station identifier transmitted by the network side, wherein the 5G base station identifier is a base station identifier of the 5G base station corresponding to the second device information matching with the first device information; and a second determining submodule, configured to determine a 5G base station indicated by the 5G base station identifier as the target 5G base station.

According to a fourth aspect of the embodiments of the present disclosure, there is provided an apparatus for signaling transmission. The apparatus is applied to a 5G base station and includes:

a third receiving module, configured to receive a control signaling reported by a target terminal accessing the 5G base station for managing and controlling a target NB-IOT device; and a second transmitting module, configured to transmit the control signaling to a target NB-IOT base station, causing the target NB-IOT base station to forward the control signaling to the target NB-IOT device, thereby causing the target NB-IOT device to perform an operation corresponding to the control signaling; wherein the target NB-IOT base station is an NB-IOT base station accessed by the target NB-IOT device.

Optionally, the second transmitting module includes:

a first transmitting submodule, configured to transmit the control signaling to the target NB-IOT base station through a base station interface between the 5G base station and the target NB-IOT base station.

Optionally, the second transmitting module includes:

a second transmitting submodule, configured to transmit the control signaling to a network side, causing the network side to forward the control signaling to the target NB-IOT base station.

Optionally, the apparatus further includes:

a fourth receiving module, configured to receive second device information transmitted by the target terminal to the 5G base station, wherein the second device information is device information of the target NB-IOT device currently required to be managed and controlled by the target terminal; and a second base station determining module, configured to determine the target NB-IOT base station according to the second device information.

Optionally, the second base station determining module includes:

a second matching submodule, configured to perform information interaction through a base station interface between the 5G base station and an NB-IOT base station, and compare first device information received by the NB-IOT base station with the second device information, wherein the first device information is device information of the NB-IOT device reported by the NB-IOT device accessing the NB-IOT base station; and a third determining submodule, configured to determine an NB-IOT base station corresponding to the first device information matching with the second device information as the target NB-IOT base station.

Optionally, the second base station determining module includes:

a second reporting submodule, configured to report the second device information to a network side, causing the network device to compare, after receiving first device information reported by the NB-IOT base station, the first device information with the second device information, wherein the first device information is device information of an NB-IOT device reported by the NB-IOT device accessing the NB-IOT base station;

a fourth receiving submodule, configured to receive an NB-IOT base station identifier transmitted by the network side, wherein the NB-IOT base station identifier is a base station identifier of an NB-IOT base station corresponding to the first device information matching with the second device information; and a fourth determining submodule, configured to determine the NB-IOT base station indicated by the NB-IOT base station identifier as the target NB-IOT base station.

According to a fifth aspect of the embodiments of the present disclosure, there is provided a computer readable storage medium storing a computer program, which is used for performing the method for signaling transmission according to the first aspect.

According to a sixth aspect of the embodiments of the present disclosure, there is provided a computer readable storage medium storing a computer program, which is used for performing the method for signaling transmission according to the second aspect.

According to a seventh aspect of the embodiments of the present disclosure, there is provided an apparatus for signaling transmission. The apparatus is used in a cellular-based Narrow Band Internet of Things (NB-IOT) base station, and the apparatus includes:

a processor, and a memory configured to store instructions executable by the processor.

The processor is configured to:

receive a control signaling transmitted by a target 5G base station, wherein the target 5G base station is a 5G base station being accessed by a target terminal, the target terminal is a terminal configured to manage and control a target NB-IOT device, and the target NB-IOT device is an NB-IOT device accessing the NB-IOT base station; and transmit the control signaling to the target NB-IOT device, causing the target NB-IOT device to execute a corresponding operation according to the control signaling.

According to an eighth aspect of the embodiments of the present disclosure, there is provided an apparatus for signaling transmission. The apparatus is used in a 5G base station, and the apparatus includes:

a processor, and a memory configured to store instructions executable by the processor.

The processor is configured to:

receive a control signaling reported by a target terminal accessing the 5G base station for managing and controlling a target NB-IOT device; and transmit the control signaling to a target NB-IOT base station, causing the target NB-IOT base station to forward the control signaling to the target NB-IOT device, thereby causing the target NB-IOT device to perform an operation corresponding to the control signaling; wherein the target NB-IOT base station is an NB-IOT base station accessed by the target NB-IOT device.

The technical solutions provided by the embodiments of the present disclosure may include the following beneficial effects.

In the embodiments of the present disclosure, after receiving a control signaling transmitted by a target 5G base station, an NB-IOT base station forwards the control signaling to a target NB-IOT device, such that the target NB-IOT device executes a corresponding operation on the basis of the control signaling. The target 5G base station is a 5G base station being accessed by a target terminal, the target terminal is a terminal used for managing and controlling a target NB-IOT device, and the target NB-IOT device is an NB-IOT device having accessed the NB-IOT base station. Through the above procedures, after receiving the control signaling transmitted by the target 5G base station, the NB-IOT base station may forward the control signaling to the corresponding target NB-IOT device. In this way, the goal of transmitting to the NB-IOT device the control signaling transmitted by a terminal is implemented. Furthermore, the goal of managing and controlling the NB-IOT device via the terminal is implemented, and the performance of a 5G system is improved.

In the embodiments of the present disclosure, the NB-IOT base station may receive, through a base station interface between the NB-IOT base station itself and the target 5G base station, the control signaling transmitted by the target 5G base station. Optionally, the 5G base station transmits the control signaling to a network side, and the NB-IOT base station receives the control signaling that is forwarded by the network side. In this way, the goal of receiving, by the NB-IOT base station, the control signaling transmitted by the 5G base station is implemented.

In the embodiments of the present disclosure, before receiving the control signaling transmitted by the target 5G base station, the NB-IOT base station may determine the target 5G base station based on device information of the target NB-IOT device reported by the target NB-IOT device after the target NB-IOT device has accessed the NB-IOT base station, i.e., the first device information. Optionally, the NB-IOT base station may interact with a 5G base station through a base station interface between the NB-IOT base station itself and the 5G base station, match second device information received by the 5G base station with the first device information, and determine the 5G base station corresponding to the second device information that consistently matches the first device information as the target 5G base station. Through the above procedures, the target 5G base station may be determined based on the NB-IOT base station, and the performance of a 5G system may be improved.

In the embodiments of the present disclosure, before the NB-IOT base station receives the control signaling transmitted by the target 5G base station, the network side may match the second device information with the first device information to determine the target 5G base station. The second device information is device information, transmitted by a terminal accessing the 5G base station to the 5G base station, of the NB-IOT device that is currently needed to be managed and controlled by the terminal. Through the above procedures, the target 5G base station may be determined based on the network side, and the performance of a 5G system may be improved.

In the embodiments of the present disclosure, after receiving a control signaling reported by a target terminal having accessed the 5G base station to manage a target NB-IOT device, the 5G base station may transmit the control signaling to a target NB-IOT base station, such that the target NB-IOT base station forwards the control signaling to the target NB-IOT device, and the target NB-IOT device performs an operation corresponding to the control signaling. The target NB-IOT base station is an NB-IOT base station to which the target NB-IOT device has accessed. Through the above procedures, after receiving the control signaling reported by the target terminal, the 5G base station may transmit the control signaling to the target NB-IOT base station. After receiving the control signaling, the target NB-IOT base station forwards the control signaling to the corresponding target NB-IOT device. In this way, the goal of transmitting to the NB-IOT device the control signaling transmitted by a terminal is implemented. Furthermore, the goal of managing and controlling the NB-IOT device via the terminal is implemented, and the performance of a 5G system is improved.

In the embodiments of the present disclosure, the 5G base station may transmit a control signaling through a base station interface between the 5G base station itself and a target NB-IOT base station. Optionally, the 5G base station transmits the control signaling to a network side, and then the network side forwards the control signaling to the target NB-IOT base station. In this way, the goal of transmitting the control signaling by the 5G base station to the NB-IOT base station is implemented.

In the embodiments of the present disclosure, before transmitting a control signaling to a target NB-IOT base station, the 5G base station may first determine the target NB-IOT base station based on the second device information, i.e., device information, transmitted by a target terminal to the 5G base station, of the NB-IOT device that is currently needed to be managed and controlled by the target terminal. Optionally, the 5G base station may interact with an NB-IOT base station through a base station interface between the 5G base station itself and the NB-IOT base station, match first device information received by the NB-IOT base station with the second device information, and determine the NB-IOT base station corresponding to the first device information that consistently matches the second device information as the target NB-IOT base station. Through the above procedures, the target NB-IOT base station may be determined based on the 5G base station, and the performance of a 5G system may be improved.

In the embodiments of the present disclosure, before the 5G base station transmits the control signaling to the target NB-IOT base station, the network side may match the first device information with the second device information to determine the target NB-IOT base station. The first device information is device information of the NB-IOT device that is reported by the NB-IOT device having accessed the NB-IOT base station currently. Through the above procedures, the target NB-IOT base station may be determined based on the network side, and the performance of a 5G system may be improved.

It is to be understood that the above general description and the detailed description below are merely exemplary and explanatory, and do not limit the present disclosure.

BRIEF DESCRIPTION OF THE DRAWINGS

The accompanying drawings herein are incorporated in and constitute a part of this specification, illustrate embodiments conforming to the present disclosure and, together with the specification, serve to explain the principles of the present disclosure.

DETAILED DESCRIPTION

Reference will now be made in detail to exemplary embodiments, examples of which are illustrated in the accompanying drawings. When accompanying figures are mentioned in the following descriptions, the same numbers in different drawings represent the same or similar elements, unless otherwise represented. The implementations set forth in the following description of exemplary embodiments do not represent all implementations consistent with the present disclosure. Instead, they are merely examples of apparatuses and methods consistent with some aspects related to the present disclosure as recited in the appended claims.

Terms used in the present disclosure are only for the purpose of description of specific embodiments, and are not intended to limit the present disclosure. As used in the present disclosure and appended claims, the singular forms "a/an", "said" and "the" intend to also include the plural form, unless the content clearly dictates otherwise. It should also be understood that the term "and/or" used herein means to include arbitrary and all possible combinations of one or more items listed in association.

It should be understood that terms such as "first", "second", "third" and the like may be used herein for description of information. However, the information shall not be restricted to these terms. These terms are only intended to distinguish among information of the same type. For example, under the circumstance of not departing from the scope of the present disclosure, a first information can also be referred to as a second information, similarly, a second information can also be referred to as a first information. Depending on the context, term "if" used herein can be interpreted as "when", "while" or "in response to determining".

Figure 1:
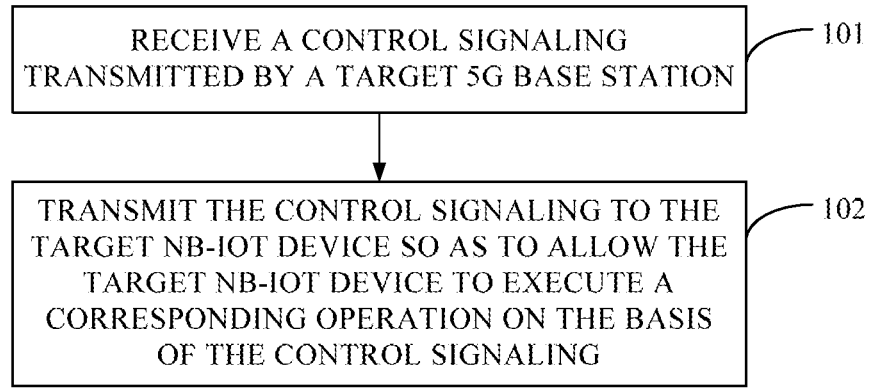
FIG. 1 is a flowchart of a device management method illustrated according to an exemplary embodiment.

The present disclosure provides a method for signaling transmission. The method may be used in an NB-IOT base station, a base station to which an NB-IOT device may be accessed. Referring to FIG. 1, a flowchart of a method for signaling transmission is illustrated according to an exemplary embodiment, which may include following steps.

In Step 101, a control signaling transmitted by a target 5G base station is received, wherein the target 5G base station is a 5G base station being accessed by a target terminal, the target terminal is a terminal used for managing and controlling a target NB-IOT device, and the target NB-IOT device is an NB-IOT device having accessed the NB-IOT base station.

In Step 102, the control signaling is transmitted to the target NB-IOT device so as to allow the target NB-IOT device to execute a corresponding operation on the basis of the control signaling.

In the above embodiment, after receiving a control signaling transmitted by a target 5G base station, an NB-IOT base station forwards the control signaling to a target NB-IOT device, such that the target NB-IOT device executes a corresponding operation on the basis of the control signaling. The target 5G base station is a 5G base station being accessed by a target terminal, the target terminal is a terminal used for managing and controlling a target NB-IOT device, and the target NB-IOT device is an NB-IOT device having accessed the NB-IOT base station. Through the above procedures, after receiving the control signaling transmitted by the target 5G base station, the NB-IOT base station may forward the control signaling to the corresponding target NB-IOT device. In this way, the goal of transmitting to the NB-IOT device the control signaling transmitted by a terminal is implemented.

Furthermore, the goal of managing and controlling the NB-IOT device via the terminal is implemented, and the performance of a 5G system is improved.

For the above Step 101, the target NB-IOT device is an NB-IOT device having accessed the NB-IOT base station, and the target terminal is a terminal used for managing and controlling the target NB-IOT device. In some embodiments of the present disclosure, the control signaling may be transmitted by the target terminal according to related technologies to the 5G base station to which the target terminal has accessed, i.e., the target 5G base station. Further, the control signaling is transmitted by the target 5G base station to the NB-IOT base station. Optionally, the NB-IOT base station may receive the control signaling in any one of the following manners.

In the first manner, the control signaling is received through a base station interface.

In this manner, a base station interface exists between the NB-IOT base station and the target 5G base station, and thus the NB-IOT base station may directly receive, through the base station interface, the control signaling transmitted by the target 5G base station.

In the second manner, the control signaling is received by the network side.

In this manner, no matter whether the base station interface exists between the NB-IOT base station and the target 5G base station, the target 5G base station may first transmit the control signaling to the network side, and then the network side forwards the control signaling to the NB-IOT base station. The network side may be a core network or a cloud platform, and the target 5G base station and the NB-IOT base station are both accessed the network side. In the foregoing procedures, the NB-IOT base station receives the control signaling forwarded by the network side.

For the above Step 102, Optionally, in the control signaling, the target terminal carries a device identifier of the target NB-IOT device, wherein the device identifier may be a Media Access Control (MAC) address of the target NB-IOT device or a device serial number, etc. The NB-IOT base station may forward the control signaling to the target NB-IOT device based on the device identifier of the target NB-IOT device carried in the control signaling according to related technologies.

After receiving the control signaling, the target NB-IOT device may perform a corresponding operation according to the control signaling.

For example, if the control signaling is a power-on control signaling, the target NB-IOT device may perform a power-on operation. If the control signaling is a file printing signaling, the target NB-IOT device may execute a file printing operation.

Figure 2:
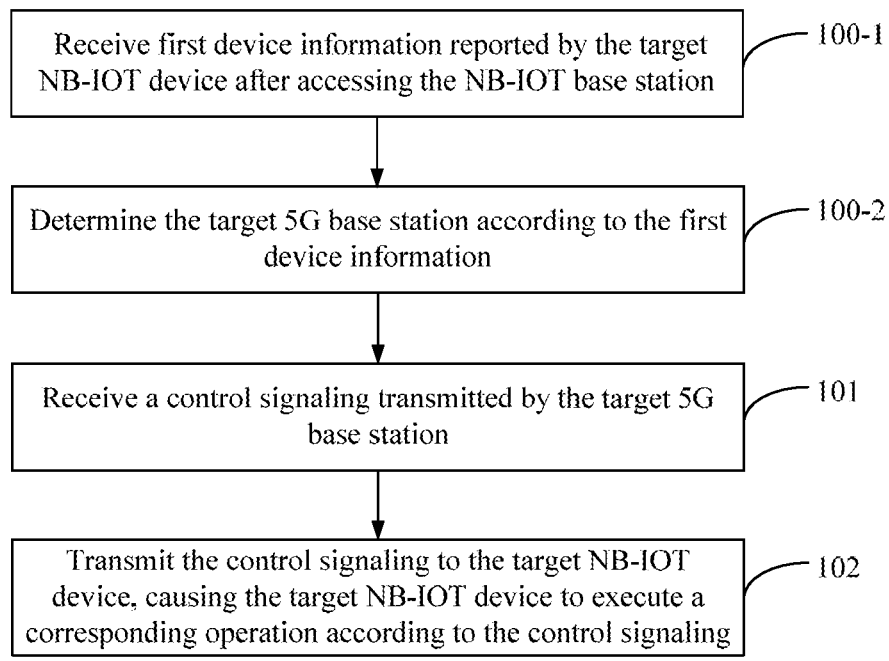
FIG. 2 is a flowchart of another device management method illustrated according to an exemplary embodiment.

In an embodiment, reference may be made to FIG. 2 for the method for signaling transmission. FIG. 2 is a flowchart of another method for signaling transmission illustrated according to the embodiment as shown in FIG. 1. Before Step 101 is executed, the method for signaling transmission may further include following steps.

In Step 100-1, first device information reported by the target NB-IOT device after the target NB-IOT device has accessed the NB-IOT base station is received.

The first device information is device information of the target NB-IOT device, and may include at least one of: a device identifier of the NB-IOT device, geographical location information, operating band information, and a device type.

The device identifier may be a MAC address of the target NB-IOT device or a device serial number, etc. The target NB-IOT device may directly search out the stored device identifier itself according to related technologies.

The geographical location information may be obtained by the target NB-IOT device through a Global Positioning System (GPS), or may be determined based on an identifier of a gateway device currently accessed by the target NB-IOT device, etc. For example, If the target NB-IOT device accesses a home router of a user, it may be determined that the geographical location information is that the target NB-IOT device is currently located in the user's home.

Each NB-IOT device operates at a fixed frequency band. In the embodiment of the present disclosure, the target NB-IOT device may detect the frequency band information when the target NB-IOT device is working, receiving or transmitting data, such that the operating band information of the target NB-IOT device is obtained.

The target NB-IOT device may determine its device type according to its own device information. For example, the device type may be a smart meter, a wearable device, a monitoring alarm system, or intelligent logistics, etc.

In this step, the first device information may be reported by the target NB-IOT device to the NB-IOT base station after the target NB-IOT device accesses the NB-IOT base station, and the NB-IOT base station may directly receive the first device information.

In Step 100-2, the target 5G base station is determined according to the first device information.

Optionally, the target 5G base station may be determined in any one of the following manners.

In the first manner, the target 5G base station is determined by the NB-IOT base station.

Figure 3:
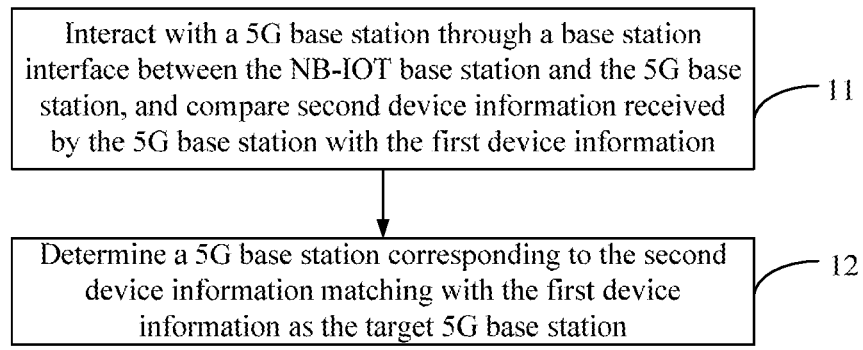
FIG. 3 is a flowchart of still another device management method illustrated according to an exemplary embodiment.

Referring to FIG. 3, a flowchart of another method for signaling transmission is illustrated based on the embodiment as shown in FIG. 2, and the Step 100-2 may include following steps.

In Step 11, the NB-IOT base station may interact with a 5G base station through a base station interface between the NB-IOT base station itself and the 5G base station, and match second device information received by the 5G base station with the first device information.

The second device information is device information, transmitted by a terminal accessing the 5G base station to the 5G base station, of the NB-IOT device that is currently needed to be managed and controlled by the terminal. Optionally, the second device information may likewise include at least one of: a device identifier of the NB-IOT device, geographical location information, operating band information, and a device type.

Any terminal having accessed the 5G base station may transmit the second device information (i.e., device information of the NB-IOT device that is currently needed to be managed and controlled by the terminal) to the 5G base station that is currently accessed by the terminal.

In this manner, a base station interface exists between the NB-IOT base station and the 5G base station. The NB-IOT base station may interact with the 5G base station through the base station interface, and match the second device information received by the 5G base station with the first device information.

In Step 12, the 5G base station corresponding to the second device information that consistently matches the first device information is determined as the target 5G base station.

In this step, if the second device information consistently matches the first device information, the 5G base station corresponding to the second device information is determined as the target 5G base station.

For example, the first device information includes a device identifier a, the second device information received by the 5G base station 1 includes a device identifier b, the second device information received by the 5G base station 2 includes a device identifier c, and the second device information received by the 5G base station 3 includes the device identifier a. In this case, the 5G base station 3 is determined as the target 5G base station.

In the above embodiments, before receiving the control signaling transmitted by the target 5G base station, the NB-IOT base station may first determine the target 5G base station based on the first device information, i.e., device information of the target NB-IOT device reported by the target NB-IOT device after the target NB-IOT device has accessed the NB-IOT base station. Optionally, the NB-IOT base station may interact with a 5G base station through a base station interface between the NB-IOT base station itself and the 5G base station, match second device information received by the 5G base station with the first device information, and determine the 5G base station corresponding to the second device information that consistently matches the first device information as the target 5G base station. Through the above procedures, the target 5G base station may be determined by the NB-IOT base station, and the performance of a 5G system may be improved.

In the second manner, the target 5G base station may be determined by the network side.

Figure 4:
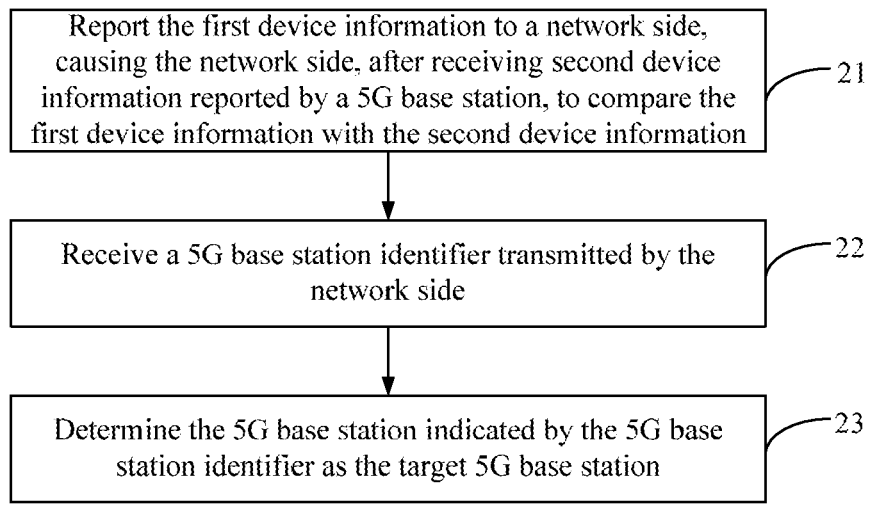
FIG. 4 is a flowchart of still another device management method illustrated according to an exemplary embodiment.

Referring to FIG. 4, a flowchart of another method for signaling transmission is illustrated based on the embodiment as shown in FIG. 2, and the Step 100-2 may include following steps.

In Step 21, the first device information is reported to a network side, such that after receiving second device information reported by a 5G base station, the network side matches the first device information with the second device information.

Likewise, the second device information is device information, transmitted by a terminal accessing the 5G base station to the 5G base station, of the NB-IOT device that is currently needed to be managed and controlled by the terminal.

In this step, the NB-IOT base station may report the first device information to the network side. After receiving the second device information, the 5G base station also reports the same to the network side, such that the network side matches the first device information with the second device information according to related technologies.

In Step 22, a 5G base station identifier transmitted by the network side is received.

The 5G base station identifier is a base station identifier of the 5G base station corresponding to the second device information that consistently matches the first device information. In this step, the network side determines, according to the matching result, the base station identifier of the 5G base station corresponding to the second device information that consistently matches the first device information, obtains the 5G base station identifier, and transmits the 5G base station identifier to the NB-IOT base station.

In Step 23, the 5G base station indicated by the 5G base station identifier is determined as the target 5G base station.

In this step, the NB-IOT base station directly determines the 5G base station indicated by the 5G base station identifier as the target 5G base station.

In the above embodiments, before the NB-IOT base station receives the control signaling transmitted by the target 5G base station, the network side may match the second device information with the first device information to determine the target 5G base station. The second device information is device information, transmitted by a terminal accessing the 5G base station to the 5G base station, of the NB-IOT device that is currently needed to be managed and controlled by the terminal. Through the above procedures, the target 5G base station may be determined by the network side, and the performance of a 5G system may be improved.

In the embodiments of the present disclosure, the NB-IOT device may transmit a control signaling for managing and controlling a terminal to an NB-IOT base station accessed by the NB-IOT device, and then the NB-IOT base station transmits, through the base station interface, the control signaling to a 5G base station accessed by the terminal. Optionally, after the NB-IOT base station transmits the control signaling to the network side, the network side forwards the control signaling to the 5G base station accessed by the terminal. After receiving the control signaling, the 5G base station transmits the control signaling to the terminal, such that the terminal may execute a corresponding operation on the basis of the control signaling. Through the above procedures, the goal of managing and controlling the terminal by the NB-IOT device may be implemented.

For example, if the NB-IOT device is a smart meter, the NB-IOT device may transmit a recharge reminder control signaling to a designated terminal according to the above procedures when the current balance is less than a preset value, such that the terminal performs a recharge reminder to remind the user to recharge the smart meter.

Figure 5:
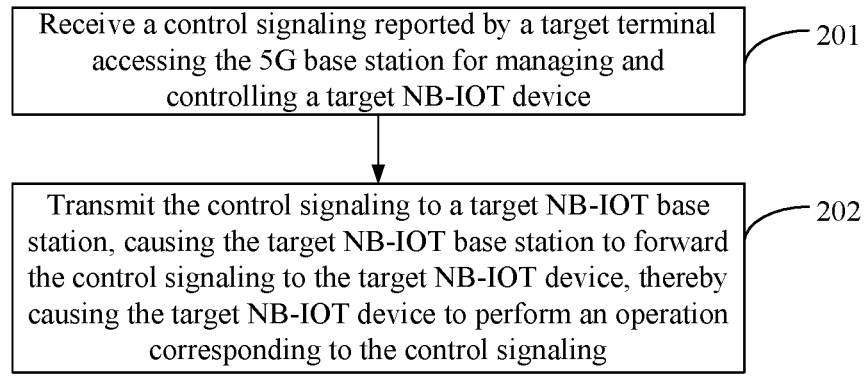
FIG. 5 is a flowchart of still another device management method illustrated according to an exemplary embodiment.

The present disclosure also provides another method for signaling transmission. The method may be used in a 5G base station, a base station to which a terminal may be accessed. Referring to FIG. 5, a flowchart of another method for signaling transmission is illustrated according to an exemplary embodiment, wherein the method may include following steps.

In Step 201, a control signaling reported by a target terminal having accessed the 5G base station is received to manage and control a target NB-IOT device.

In Step 202, the control signaling is transmitted to a target NB-IOT base station, such that the target NB-IOT base station forwards the control signaling to the target NB-IOT device, and the target NB-IOT device performs an operation corresponding to the control signaling; wherein the target NB-IOT base station is an NB-IOT base station to which the target NB-IOT device has accessed.

In the above embodiments, after receiving a control signaling reported by a target terminal having accessed the 5G base station to manage a target NB-IOT device, the 5G base station may transmit the control signaling to a target NB-IOT base station, such that the target NB-IOT base station forwards the control signaling to the target NB-IOT device, and the target NB-IOT device performs an operation corresponding to the control signaling. The target NB-IOT base station is an NB-IOT base station to which the target NB-IOT device has accessed. Through the above procedures, after receiving the control signaling reported by the target terminal, the 5G base station may transmit the control signaling to the target NB-IOT base station. After receiving the control signaling, the target NB-IOT base station forwards the control signaling to the corresponding target NB-IOT device. In this way, the goal of transmitting to the NB-IOT device the control signaling transmitted by a terminal is implemented. Furthermore, the goal of managing and controlling the NB-IOT device via the terminal is implemented, and the performance of a 5G system is improved.

For the above Step 201, when the user needs to manage and control the target NB-IOT device via the target terminal, the target terminal may report the control signaling to a 5G base station having been accessed by the target terminal, and the 5G base station directly receives the control signaling. The control signaling may be generated by the target terminal according to target control contents, wherein the target control contents are control contents indicated by a target preset control option selected by the user in a preset control option.

Further, the 5G base station may transmit the control signaling to the target NB-IOT base station in any one of the following manners.

In the first manner, the 5G base station may directly transmit the control signaling to the target NB-IOT base station through a base station interface.

In this manner, a base station interface may preexist between the 5G base station and the target NB-IOT base station, such that the 5G base station directly transmits the control signaling to the target NB-IOT base station through the base station interface.

In the second manner, the 5G base station first transmits the control signaling to a network side, and then the network side forwards the control signaling to the target NB-IOT base station.

In this manner, no matter whether the base station interface exists between the 5G base station and the target NB-IOT base station, the 5G base station may first transmit the control signaling to the network side. After searching out the target NB-IOT base station, the network side forwards the control signaling to the target NB-IOT base station.

For the above Step 202, after receiving the control signaling, the 5G base station may transmit the control signaling to a target NB-IOT base station having been accessed by the target NB-IOT device. After receiving the control signaling, the target NB-IOT base station forwards the control signaling to the target NB-IOT device, such that the target NB-IOT device performs an operation corresponding to the control signaling.

Figure 6:
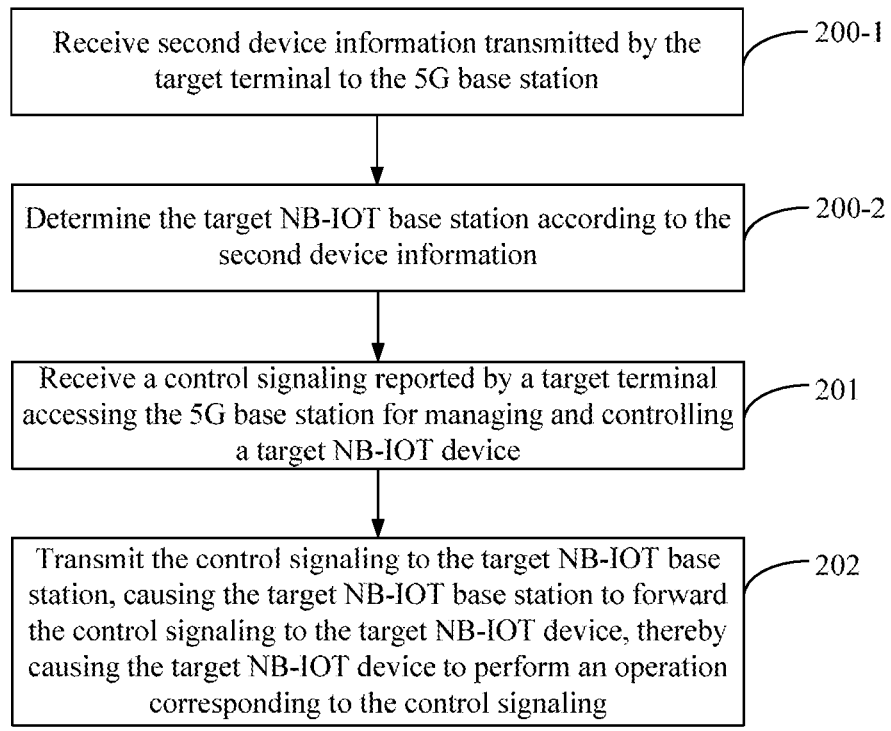
FIG. 6 is a flowchart of still another device management method illustrated according to an exemplary embodiment.

In an embodiment, reference may be made to FIG. 6 for the method for signaling transmission. FIG. 6 is a flowchart of another method for signaling transmission illustrated according to the embodiment as shown in FIG. 5. Before Step 201 is executed, the method for signaling transmission may further include following steps.

In Step 200-1, second device information transmitted by the target terminal to the 5G base station is received.

The second device information is device information of the target NB-IOT device that is currently needed to be managed and controlled by the target terminal. Optionally, the second device information may include at least one of:

a device identifier of the NB-IOT device, geographical location information, operating band information, and a device type.

The user may select, from a signaling transmission list outputted by the target terminal, a target NB-IOT device that is currently needed to be managed and controlled. The terminal reports the prestored device information of the target NB-IOT device (i.e., the second device information) to the 5G base station, and the 5G base station directly receives the second device information.

In Step 200-2, the target NB-IOT base station is determined according to the second device information.

Optionally, the target NB-IOT base station may be determined in any one of the following manners.

In the first manner, the target NB-IOT base station is determined by the target 5G base station.

Figure 7:
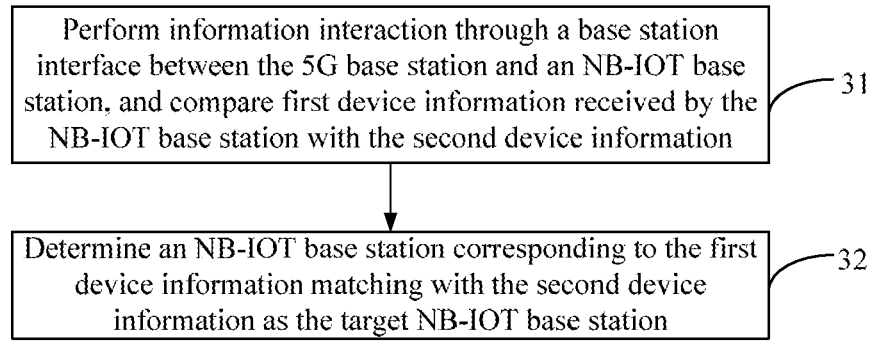
FIG. 7 is a flowchart of still another device management method illustrated according to an exemplary embodiment.

Referring to FIG. 7, a flowchart of another method for signaling transmission is illustrated based on the embodiment as shown in FIG. 6, and the Step 200-2 may include following steps.

In Step 31, the 5G base station interacts with an NB-IOT base station through a base station interface between the 5G base station itself and the NB-IOT base station, and matches first device information received by the NB-IOT base station with the second device information.

The first device information is device information of the NB-IOT device that is reported by the NB-IOT device having accessed the NB-IOT base station currently. Optionally, the first device information may likewise include at least one of: a device identifier of the NB-IOT device, geographical location information, operating band information, and a device type.

Any NB-IOT device having accessed the NB-IOT base station may transmit the first device information (i.e., device information of the NB-IOT device itself) to the NB-IOT base station that is currently accessed.

In this manner, a base station interface exists between the 5G base station and the NB-IOT base station. The 5G base station may interact with the NB-IOT base station through the base station interface, and match the first device information received by the NB-IOT base station with the second device information.

In Step 32, the NB-IOT base station corresponding to the first device information that consistently matches the second device information is determined as the target NB-IOT base station.

In this step, if the first device information consistently matches the second device information, the NB-IOT base station corresponding to the first device information is determined as the target NB-IOT base station.

For example, the second device information includes a device identifier a, the first device information received by the NB-IOT base station 1 includes a device identifier b and a device identifier c, the first device information received by the NB-IOT base station 2 includes a device identifier a, and the first device information received by the NB-IOT base station 3 includes a device identifier d. In this case, the NB-IOT base station 2 is determined as the target NB-IOT base station.

In the above embodiments, before transmitting a control signaling to a target NB-IOT base station, the 5G base station may first determine the target NB-IOT base station based on the second device information, i.e., device information, transmitted by a target terminal to the 5G base station, of the NB-IOT device that is currently needed to be managed and controlled by the target terminal. Optionally, the 5G base station may interact with an NB-IOT base station through a base station interface between the 5G base station itself and the NB-IOT base station, match first device information received by the NB-IOT base station with the second device information, and determine the NB-IOT base station corresponding to the first device information that consistently matches the second device information as the target NB-IOT base station. Through the above procedures, the target NB-IOT base station may be determined based on the 5G base station, and the performance of a 5G system may be improved.

In the second manner, the target NB-IOT base station is determined by the network side.

Figure 8:
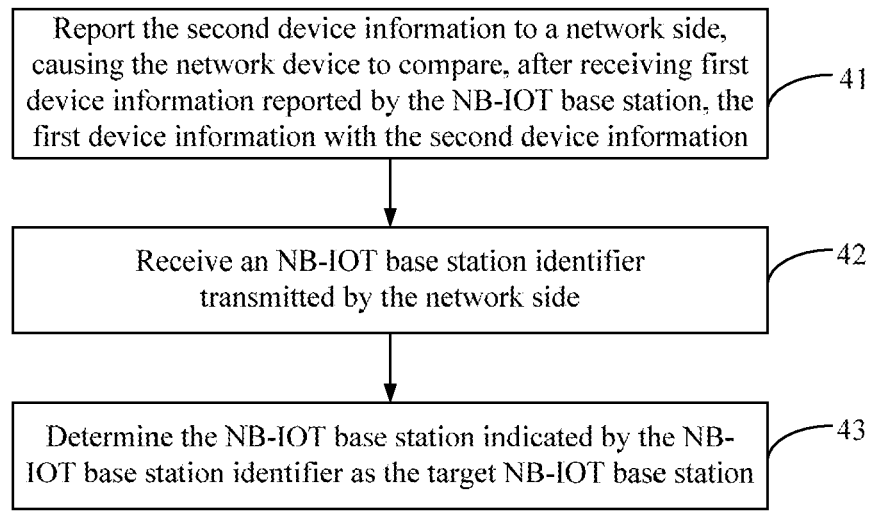
FIG. 8 is a flowchart of still another device management method illustrated according to an exemplary embodiment.

Referring to FIG. 8, a flowchart of another method for signaling transmission is illustrated based on the embodiment as shown in FIG. 6, and the Step 200-2 may include following steps.

In Step 41, the second device information is reported to a network side, such that after receiving first device information reported by the NB-IOT base station, the network side matches the first device information with the second device information.

The first device information is device information of the NB-IOT device that is reported by the NB-IOT device having accessed the NB-IOT base station currently.

In this step, the 5G base station may report the second device information to the network side. After receiving the first device information, the NB-IOT base station also reports the first device information to the network side, such that the network side matches the second device information with the first device information according to related technologies.

In Step 42, an NB-IOT base station identifier transmitted by the network side is received.

The NB-IOT base station identifier is a base station identifier of the NB-IOT base station corresponding to the first device information that consistently matches the second device information. In this step, the network side determines, according to the matching result, the base station identifier (i.e., the NB-IOT base station identifier) of the NB-IOT base station corresponding to the first device information that consistently matches the second device information, and transmits the NB-IOT base station identifier to the 5G base station.

In Step 43, the NB-IOT base station indicated by the NB-IOT base station identifier is determined as the target NB-IOT base station.

In this step, the 5G base station directly determines the NB-IOT base station indicated by the NB-IOT base station identifier as the target NB-IOT base station.

In the above embodiments, before the 5G base station transmits the control signaling to the target NB-IOT base station, the network side may match the first device information with the second device information to determine the target NB-IOT base station. The first device information is device information of the NB-IOT device that is reported by the NB-IOT device having accessed the NB-IOT base station currently. Through the above procedures, the target NB-IOT base station may be determined based on the network side, and the performance of a 5G system may be improved.

In this embodiment, the NB-IOT device may be managed and controlled by the terminal, or the terminal may be managed and controlled by the NB-IOT device. Thus, objectives of interoperation and mutual management and control between the terminal and the NB-IOT device are implemented, and the performance of a 5G system is improved.

The present disclosure also provides another method for signaling transmission.

Figure 9:
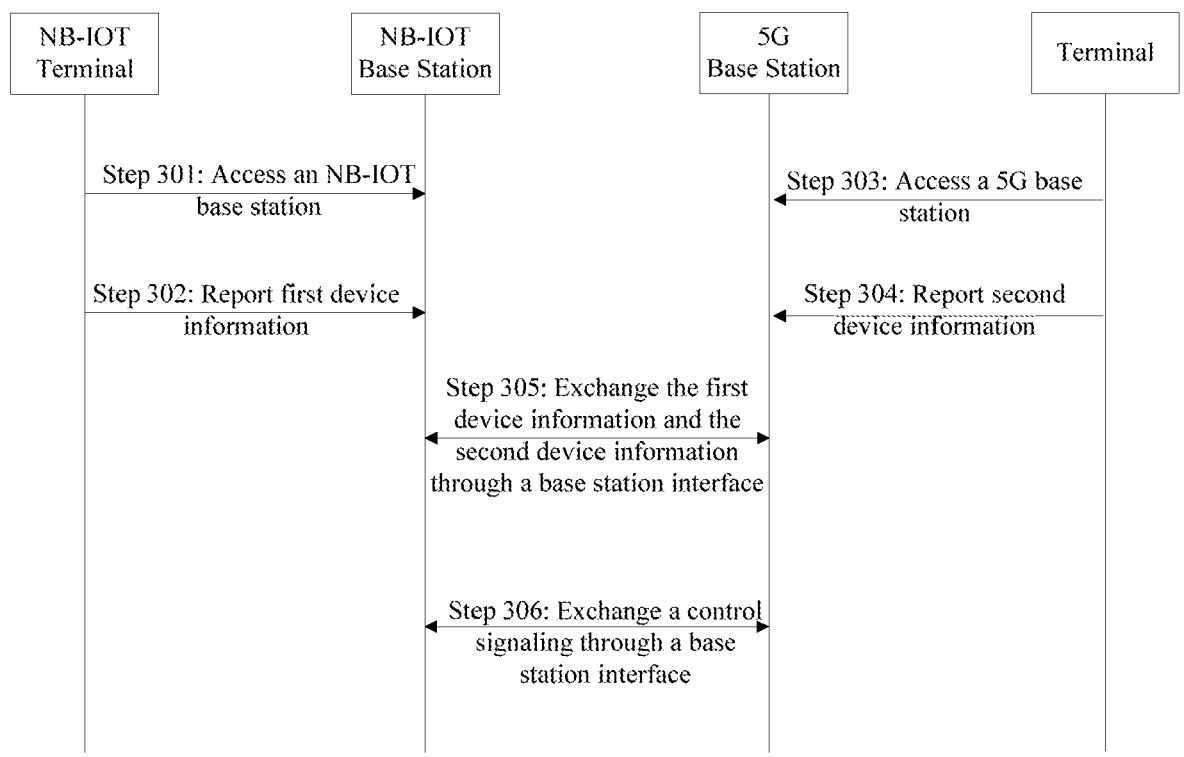
FIG. 9 is a flowchart of still another device management method illustrated according to an exemplary embodiment.

Referring to FIG. 9, a flowchart of another method for signaling transmission is illustrated according to an exemplary embodiment, wherein the method may include following steps.

In Step 301, an NB-IOT device accesses an NB-IOT base station.

In Step 302, the NB-IOT device reports first device information to the NB-IOT base station.

The first device information is device information of the NB-IOT device.

In Step 303, a terminal accesses a 5G base station.

In Step 304, the terminal reports second device information to the 5G base station.

The second device information is device information of the NB-IOT device that is managed and controlled by the terminal.

In Step 305, the NB-IOT base station and the 5G base station exchange the first device information and the second device information through a base station interface.

Step 306 may be performed if the NB-IOT base station or the 5G base station determines that the first device information consistently matches the second device information.

In Step 306, the NB-IOT base station and the 5G base station exchange a control signaling through a base station interface.

The control signaling may be either a signaling used for managing and controlling a terminal by an NB-IOT device, or a signaling used for managing and controlling the NB-IOT device by the terminal.

In the above embodiments, the NB-IOT base station and the 5G base station may exchange a control signaling through a base station interface, thereby implementing interoperation and management and control between the terminal and the NB-IOT device, and improving the performance of a 5G system.

The present disclosure also provides another method for signaling transmission.

Figure 10:
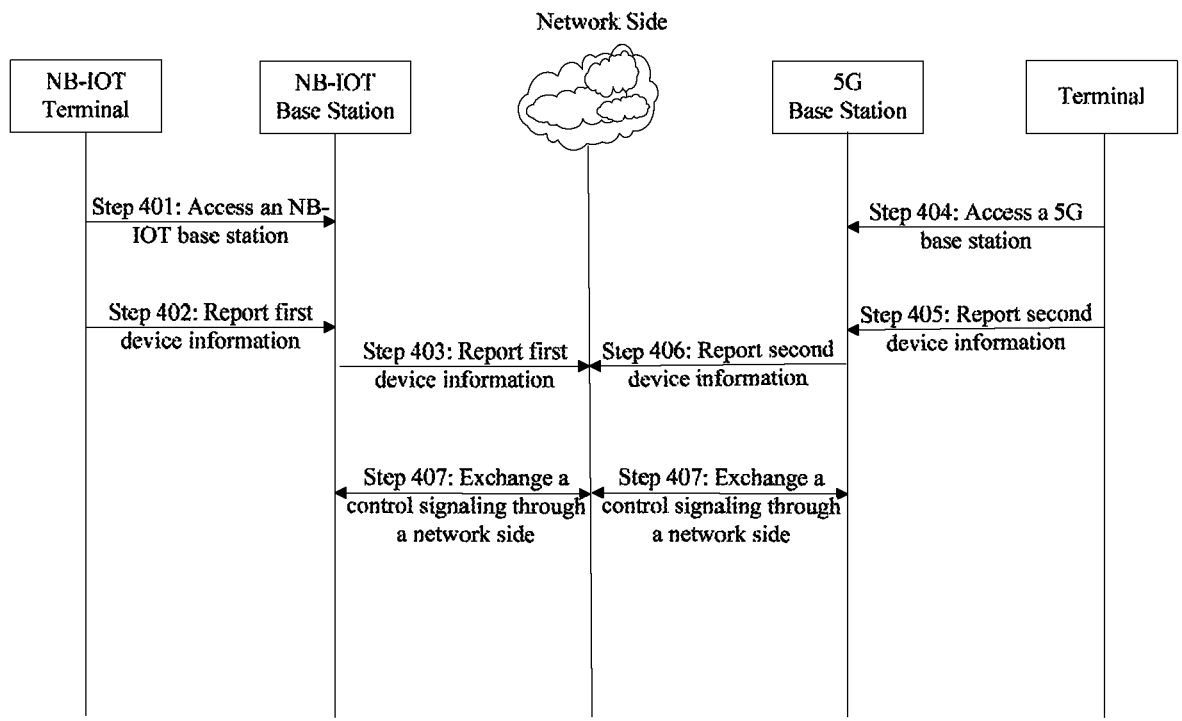
FIG. 10 is a flowchart of still another device management method illustrated according to an exemplary embodiment.

Referring to FIG. 10, a flowchart of another method for signaling transmission is illustrated according to an exemplary embodiment, wherein the method may include following steps.

In Step 401, an NB-IOT device accesses an NB-IOT base station.

In Step 402, the NB-IOT device reports first device information to the NB-IOT base station.

The first device information is device information of the NB-IOT device.

In Step 403, the NB-IOT base station reports the first device information to a network side.

The network side may be a core network or a cloud platform.

In Step 404, a terminal accesses a 5G base station.

In Step 405, the terminal reports second device information to the 5G base station.

The second device information is device information of the NB-IOT device that is managed and controlled by the terminal.

In Step 406, the 5G base station reports the second device information to the network side.

Step 407 may be performed if the network side determines that the first device information consistently matches the second device information.

In Step 407, the NB-IOT base station and the 5G base station exchange a control signaling through the network side.

Likewise, the control signaling may be either a signaling used for managing and controlling a terminal by an NB-IOT device, or a signaling used for managing and controlling the NB-IOT device by the terminal.

In the above embodiments, the NB-IOT base station and the 5G base station may exchange a control signaling through the network side, thereby implementing interoperation and management and control between the terminal and the NB-IOT device, and improving the performance of a 5G system.

It should be explained that, for a brief description, the foregoing method examples are described as a combination of a series of motions. However, those skilled in the art should know that the present disclosure is not limited by sequences of the motions described. This is because some steps may be performed by using other sequences or be performed simultaneously in accordance with the present disclosure.

In addition, those skilled in the art should also learn that the embodiments described in the specification are preferred embodiments, and involved motions and modules are not necessary for the present disclosure.

Corresponding to the foregoing embodiments of an application function implementing method, the present disclosure also provides embodiments of an application function implementing apparatus and a corresponding terminal.

Figure 11:
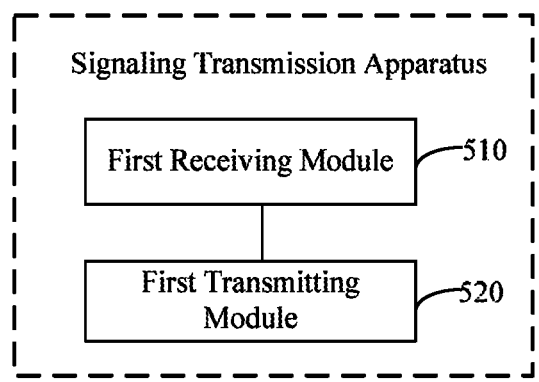
FIG. 11 is a block diagram of a device management apparatus illustrated according to an exemplary embodiment.

Referring to FIG. 11, a block diagram of an apparatus for signaling transmission illustrated according to an exemplary embodiment, the apparatus is used in a cellular-based Narrow Band Internet of Things (NB-IOT) base station, and the apparatus includes:

a first receiving module 510, configured to receive a control signaling transmitted by a target 5G base station, wherein the target 5G base station is a 5G base station being accessed by a target terminal, the target terminal is a terminal used for managing and controlling a target NB-IOT device, and the target NB-IOT device is an NB-IOT device having accessed the NB-IOT base station; and a first transmitting module 520, configured to transmit the control signaling to the target NB-IOT device so as to allow the target NB-IOT device to execute a corresponding operation on the basis of the control signaling.

Figure 12:
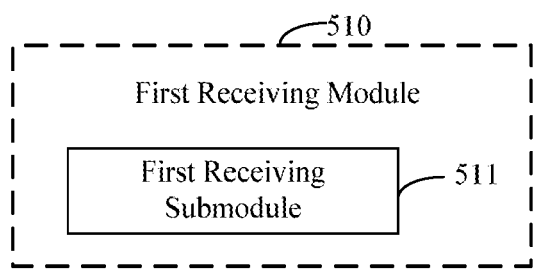
FIG. 12 is a block diagram of another device management apparatus illustrated according to an exemplary embodiment.

Referring to FIG. 12, which is a block diagram of another apparatus for signaling transmission illustrated on the basis of the embodiment as shown in FIG. 11, the first receiving module 510 includes:

a first receiving submodule 511, configured to receive, through a base station interface between the first receiving submodule itself and the target 5G base station, the control signaling transmitted by the target 5G base station.

Figure 13:
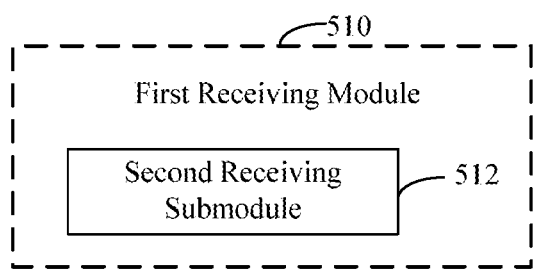
FIG. 13 is a block diagram of still another device management apparatus illustrated according to an exemplary embodiment.

Referring to FIG. 13, which is a block diagram of still another apparatus for signaling transmission illustrated on the basis of the embodiment as shown in FIG. 11, the first receiving module 510 includes:

a second receiving submodule 512, configured to receive the control signaling that is transmitted by the target 5G base station to a network side and is forwarded by the network side.

Figure 14:
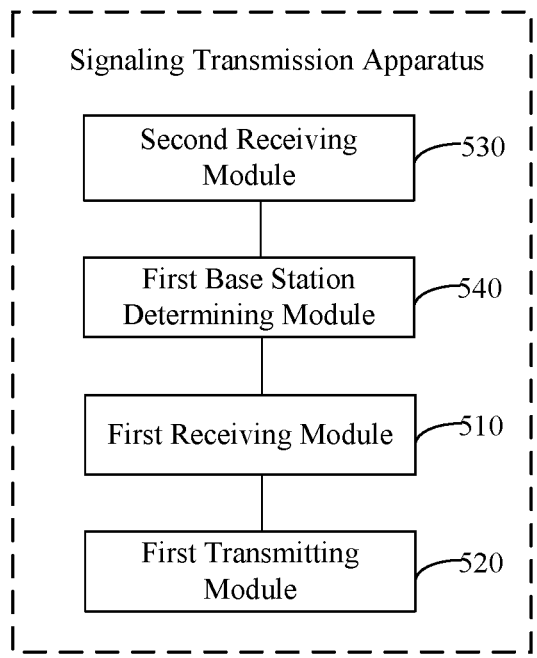
FIG. 14 is a block diagram of still another device management apparatus illustrated according to an exemplary embodiment.

Referring to FIG. 14, which is a block diagram of still another apparatus for signaling transmission illustrated on the basis of the embodiment as shown in FIG. 11, the apparatus further includes:

a second receiving module 530, configured to receive first device information reported by the target NB-IOT device after the target NB-IOT device has accessed the NB-IOT base station, wherein the first device information is device information of the target NB-IOT device; and a first base station determining module 540, configured to determine the target 5G base station according to the first device information.

Figure 15:
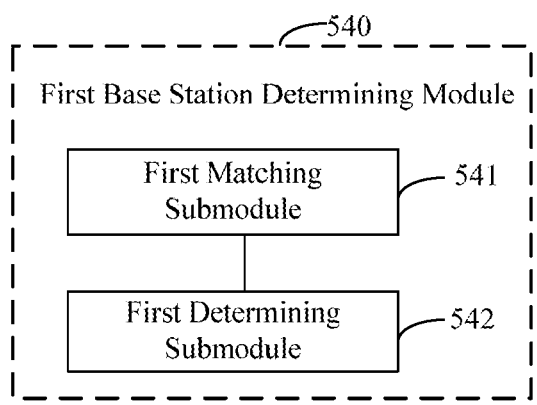
FIG. 15 is a block diagram of still another device management apparatus illustrated according to an exemplary embodiment.

Referring to FIG. 15, which is a block diagram of still another apparatus for signaling transmission illustrated on the basis of the embodiment as shown in FIG. 14, the first base station determining module 540 includes:

a first matching submodule 541, configured to interact with a 5G base station through a base station interface between the first matching submodule itself and the 5G base station, and match second device information received by the 5G base station with the first device information, wherein the second device information is device information, transmitted by a terminal accessing the 5G base station to the 5G base station, of the NB-IOT device that is currently needed to be managed and controlled by the terminal; and a first determining submodule 542, configured to determine the 5G base station corresponding to the second device information that consistently matches the first device information as the target 5G base station.

Figure 16:
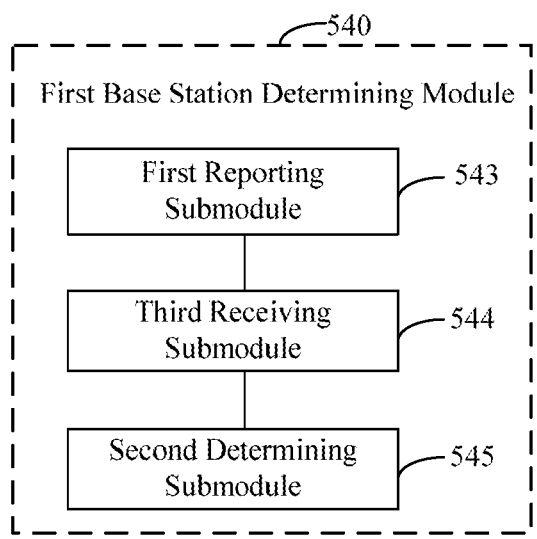
FIG. 16 is a block diagram of still another device management apparatus illustrated according to an exemplary embodiment.

Referring to FIG. 16, which is a block diagram of still another apparatus for signaling transmission illustrated on the basis of the embodiment as shown in FIG. 14, the first base station determining module 540 includes:

a first reporting submodule 543, configured to report the first device information to a network side, such that after receiving second device information reported by a 5G base station, the network side matches the first device information with the second device information, wherein the second device information is device information, transmitted by a terminal accessing the 5G base station to the 5G base station, of the NB-IOT device that is currently needed to be managed and controlled by the terminal;

a third receiving submodule 544, configured to receive a 5G base station identifier transmitted by the network side, wherein the 5G base station identifier is a base station identifier of the 5G base station corresponding to the second device information that consistently matches the first device information; and a second determining submodule 545, configured to determine the 5G base station indicated by the 5G base station identifier as the target 5G base station.

Figure 17:
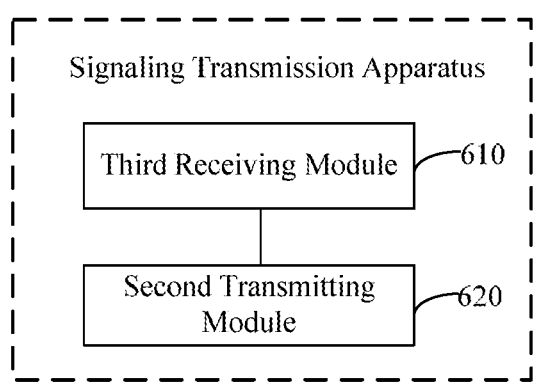
FIG. 17 is a block diagram of still another device management apparatus illustrated according to an exemplary embodiment.

Referring to FIG. 17, which is a block diagram of still another apparatus for signaling transmission illustrated on the basis of an exemplary embodiment, the apparatus is used in a 5G base station, and the apparatus includes:

a third receiving module 610, configured to receive a control signaling reported by a target terminal having accessed the 5G base station to manage and control a target NB-IOT device; and a second transmitting module 620, configured to transmit the control signaling to a target NB-IOT base station, such that the target NB-IOT base station forwards the control signaling to the target NB-IOT device, and the target NB-IOT device performs an operation corresponding to the control signaling; wherein the target NB-IOT base station is an NB-IOT base station to which the target NB-IOT device has accessed.

Figure 18:
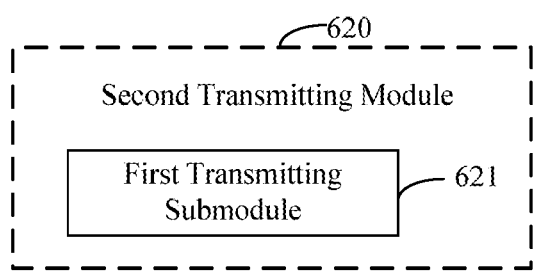
FIG. 18 is a block diagram of still another device management apparatus illustrated according to an exemplary embodiment.

Referring to FIG. 18, which is a block diagram of still another apparatus for signaling transmission illustrated on the basis of the embodiment as shown in FIG. 17, the second transmitting module 620 includes:

a first transmitting submodule 621, configured to transmit the control signaling to the target NB-IOT base station through a base station interface between the first transmitting submodule itself and the target NB-IOT base station.

Figure 19:
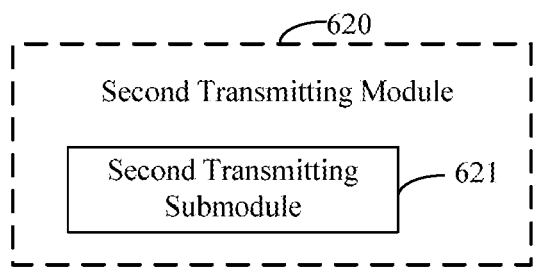
FIG. 19 is a block diagram of still another device management apparatus illustrated according to an exemplary embodiment.

Referring to FIG. 19, which is a block diagram of still another apparatus for signaling transmission illustrated on the basis of the embodiment as shown in FIG. 17, the second transmitting module 620 includes:

a second transmitting submodule 622, configured to transmit the control signaling to a network side, such that the network side forwards the control signaling to the target NB-IOT base station.

Figure 20:
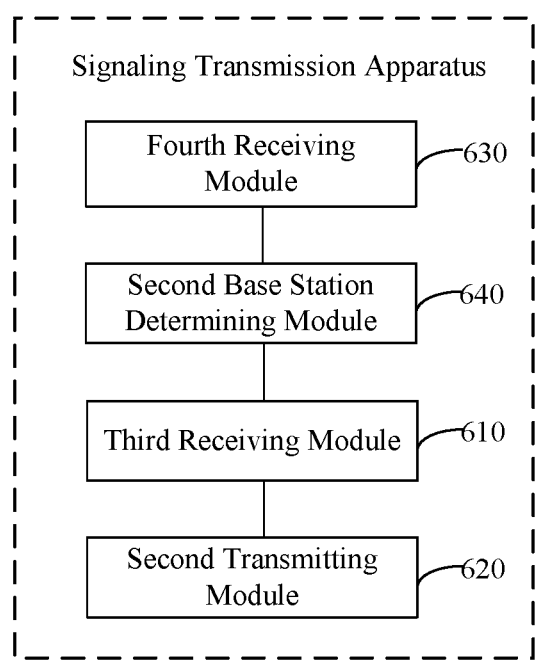
FIG. 20 is a block diagram of still another device management apparatus illustrated according to an exemplary embodiment.

Referring to FIG. 20, which is a block diagram of still another apparatus for signaling transmission illustrated on the basis of the embodiment as shown in FIG. 17, the apparatus further includes:

a fourth receiving module 630, configured to receive second device information transmitted by the target terminal to the 5G base station, wherein the second device information is device information of the target NB-IOT device that is currently needed to be managed and controlled by the target terminal; and a second base station determining module 640, configured to determine the target NB-IOT base station according to the second device information.

Figure 21:
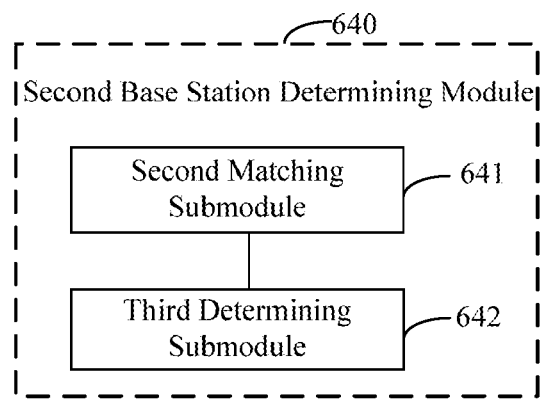
FIG. 21 is a block diagram of still another device management apparatus illustrated according to an exemplary embodiment.

Referring to FIG. 21, which is a block diagram of still another apparatus for signaling transmission illustrated on the basis of the embodiment as shown in FIG. 20, the second base station determining module 640 includes:

a second matching submodule 641, configured to perform information interaction through a base station interface between the second matching submodule itself and an NB-IOT base station, and match first device information received by the NB-IOT base station with the second device information, wherein the first device information is device information of the NB-IOT device that is reported by the NB-IOT device having accessed the NB-IOT base station currently; and a third determining submodule 642, configured to determine the NB-IOT base station corresponding to the first device information that consistently matches the second device information as the target NB-IOT base station.

Figure 22:
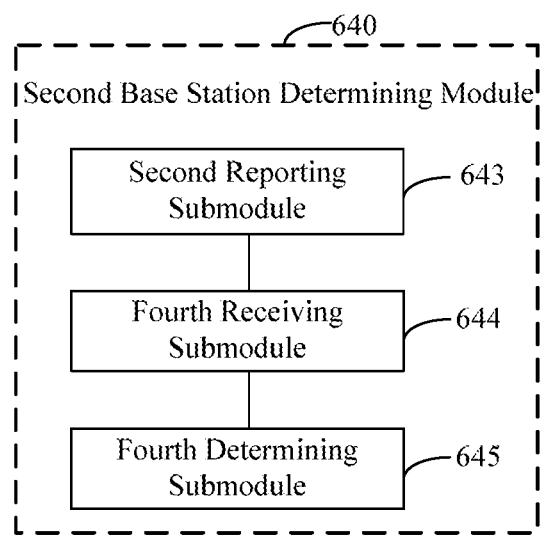
FIG. 22 is a block diagram of still another device management apparatus illustrated according to an exemplary embodiment.

Referring to FIG. 22, which is a block diagram of still another apparatus for signaling transmission illustrated on the basis of the embodiment as shown in FIG. 20, the second base station determining module 640 includes:

a second reporting submodule 643, configured to report the second device information to a network side, such that after receiving first device information reported by the NB-IOT base station, the network device matches the first device information with the second device information, wherein the first device information is device information of the NB-IOT device reported by the NB-IOT device having accessed the NB-IOT base station;

a fourth receiving submodule 644, configured to receive an NB-IOT base station identifier transmitted by the network side, wherein the NB-IOT base station identifier is a base station identifier of the NB-IOT base station corresponding to the first device information that consistently matches the second device information; and a fourth determining submodule 645, configured to determine the NB-IOT base station indicated by the NB-IOT base station identifier as the target NB-IOT base station.

Apparatus embodiments are basically corresponding to the method embodiments, and thus method embodiments can serve as reference. The apparatus embodiments set forth above are merely exemplary, wherein units described as detached parts can be or not be detachable physically; parts displayed as units can be or not be physical units, i.e., either located at the same place, or distributed on a plurality of network units. Modules can be selected in part or in whole according to the actual needs for realization of solutions of the present disclosure. It is conceivable and executable for those of ordinary skill in the art without creative labor.

Correspondingly, the embodiments of the present disclosure also provide a computer readable storage medium storing a computer program, wherein the computer program is used for performing any one of the methods for signaling transmission used in the NB-IOT base station.

Correspondingly, the embodiments of the present disclosure also provide a computer readable storage medium storing a computer program, wherein the computer program is used for performing any one of the methods for signaling transmission used in the 5G base station.

Correspondingly, the embodiments of the present disclosure also provide an apparatus for signaling transmission. The apparatus is used in a cellular-based Narrow Band Internet of Things (NB-IOT) base station, and the apparatus includes:

a processor, and a memory configured to store instructions executable by the processor.

The processor is configured to:

receive a control signaling transmitted by a target 5G base station, wherein the target 5G base station is a 5G base station being accessed by a target terminal, the target terminal is a terminal used for managing and controlling a target NB-IOT device, and the target NB-IOT device is an NB-IOT device having accessed the NB-IOT base station; and transmit the control signaling to the target NB-IOT device so as to allow the target NB-IOT device to execute a corresponding operation on the basis of the control signaling.

Figure 23:
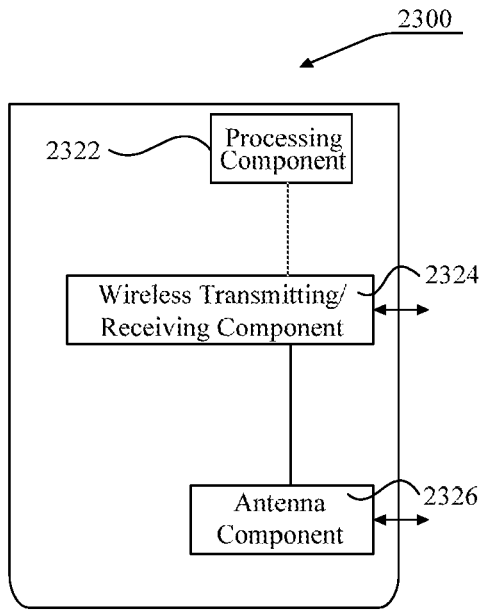
FIG. 23 is a schematic structural diagram of a device management apparatus illustrated according to an exemplary embodiment of the present disclosure.

As shown in FIG. 23, a schematic structural diagram of an apparatus 2300 for signaling transmission is illustrated according to an exemplary embodiment of the present disclosure. The apparatus 2300 may be provided as an NB-IOT base station. Referring to FIG. 23, the apparatus 2300 includes a processing component 2322, a wireless transmitting/receiving component 2324, an antenna component 2326, and a signal processing portion peculiar to a wireless interface. The processing component 2322 may further include one or more processors.

One processor of the processing component 2322 may be configured to:

receive a control signaling transmitted by a target 5G base station, wherein the target 5G base station is a 5G base station being accessed by a target terminal, the target terminal is a terminal used for managing and controlling a target NB-IOT device, and the target NB-IOT device is an NB-IOT device having accessed the NB-IOT base station; and transmit the control signaling to the target NB-IOT device so as to allow the target NB-IOT device to execute a corresponding operation on the basis of the control signaling.

Correspondingly, the embodiments of the present disclosure further provide an apparatus for signaling transmission. The apparatus is used in a 5G base station and includes:

a processor, and a memory configured to store instructions executable by the processor.

The processor is configured to:

receive a control signaling reported by a target terminal having accessed the 5G base station to manage and control a target NB-IOT device; and transmit the control signaling to a target NB-IOT base station, such that the target NB-IOT base station forwards the control signaling to the target NB-IOT device, and the target NB-IOT device performs an operation corresponding to the control signaling; wherein the target NB-IOT base station is an NB-IOT base station to which the target NB-IOT device has accessed.

Figure 24:
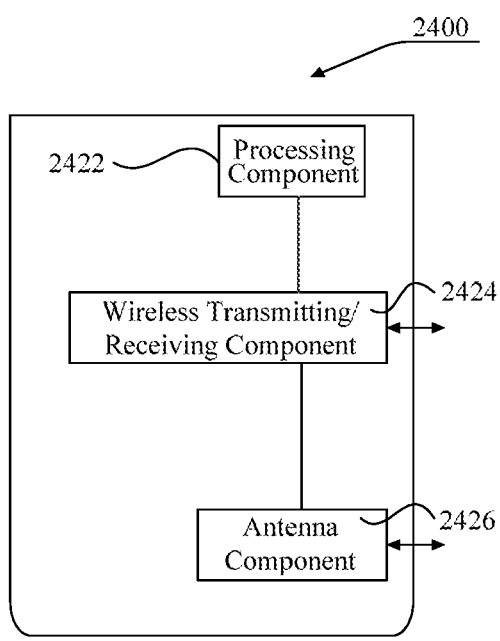
FIG. 24 is a schematic structural diagram of another device management apparatus illustrated according to an exemplary embodiment of the present disclosure.

As shown in FIG. 24, a schematic structural diagram of an apparatus 2400 for signaling transmission is illustrated according to an exemplary embodiment of the present disclosure. The apparatus 2400 may be provided as a 5G base station. Referring to FIG. 24, the apparatus 2400 includes a processing component 2422, a wireless transmitting/receiving component 2424, an antenna component 2426, and a signal processing portion peculiar to a wireless interface. The processing component 2422 may further include one or more processors.

One processor of the processing component 2422 may be configured to:

receive a control signaling reported by a target terminal having accessed the 5G base station to manage and control a target NB-IOT device; and transmit the control signaling to a target NB-IOT base station, such that the target NB-IOT base station forwards the control signaling to the target NB-IOT device, and the target NB-IOT device performs an operation corresponding to the control signaling; wherein the target NB-IOT base station is an NB-IOT base station to which the target NB-IOT device has accessed.

Other embodiments of the present disclosure will be apparent to those skilled in the art from consideration of the specification and practice of the invention disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

The invention claimed is:

1. A method for signaling transmission, applied in a cellular-based Narrow Band Internet of Things (NB-IOT) base station, comprising:

receiving first device information reported by a NB-IOT device upon accessing the NB-IOT base station, wherein the first device information is device information of the NB-IOT device:

determining, from a plurality of 5G base stations, a 5G base station having second device information matched with the first device information, as a target 5G base station, wherein the second device information is device information of an NB-IOT device to be controlled by a terminal accessing the target 5G base station;

receiving a control signaling transmitted by the target 5G base station; and transmitting the control signaling to the NB-IOT device, causing the NB-IOT device to execute a corresponding operation according to the control signaling.

2. The method according to claim 1, wherein receiving the control signaling transmitted by the target 5G base station comprises:
   receiving, through a base station interface between the NB-IOT base station and the target 5G base station, the control signaling transmitted by the target 5G base station.

3. The method according to claim 1, wherein receiving the control signaling transmitted by the target 5G base station comprises:
   receiving the control signaling forwarded by a network side and transmitted by the target 5G base station to the network side.

4. The method according to claim 1, wherein determining the target 5G base station comprises:
   interacting with a 5G base station through a base station interface between the NB-IOT base station and the 5G base station, and comparing the second device information received by the 5G base station with the first device information; and
   determining a 5G base station corresponding to the second device information matching with the first device information as the target 5G base station.

5. The method according to claim 1, wherein determining the target 5G base station comprises:
   reporting the first device information to a network side, causing the network side to compare, after receiving the second device information reported by a 5G base station, the first device information with the second device information;
   receiving a 5G base station identifier transmitted by the network side, wherein the 5G base station identifier is a base station identifier of the 5G base station corresponding to the second device information matching with the first device information; and
   determining a 5G base station indicated by the 5G base station identifier as the target 5G base station.

6. A communication system implementing the method according to claim 1, the communication system comprising the NB-IOT base station, the target 5G base station, the target terminal, and the target NB-IOT device; wherein:
   after receiving the control signaling reported by the target terminal having accessed the 5G base station to manage the target NB-IOT device, the 5G base station is configured to transmit the control signaling to the target NB-IOT base station, such that the target NB-IOT base station forwards the control signaling to the target NB-IOT device, and the target NB-IOT device performs an operation corresponding to the control signaling; and
   the 5G base station is further configured to transmit the control signaling through a base station interface between the 5G base station and the target NB-IOT base station.

7. The communication system of claim 6, wherein:
   prior to transmitting the control signaling to the target NB-IOT base station, the 5G base station is configured to first determine the target NB-IOT base station based on device information, transmitted by the target terminal to the 5G base station, of the NB-IOT device that is currently needed to be managed and controlled by the target terminal, thereby determining the target NB-IOT base station based on the 5G base station, and improving performance of the communication system.

8. An apparatus for signaling transmission, applied to a cellular-based Narrow Band Internet of Things (NB-IOT) base station, comprising:
   a processor, and
   a memory configured to store instructions executable by the processor;
   wherein the processor is configured to:
   receive first device information reported b a NB-IOT device upon accessing the NB-IOT base station, wherein the first device information is device information of the NB-IOT device;
   determine, from a plurality of 5G base stations, a 5G base station, which sends second device information matched with the first device information, as a target 5G base station, wherein the second device information is device information of an NB-IOT device to be controlled by a terminal accessing the target 5G base station;
   receive a control signaling transmitted by the target 5G base station; and
   transmit the control signaling to the NB-IOT device, causing the NB-IOT device to execute a corresponding operation according to the control signaling.

9. The apparatus according to claim 8, wherein the processor configured to receive the control signaling transmitted by the target 5G base station is configured to:
   receive, through a base station interface between the NB-IOT base station and the target 5G base station, the control signaling transmitted by the target 5G base station.

10. The apparatus according to claim 8, wherein the processor configured to receive the control signaling transmitted by the target 5G base station is configured to:
    receive the control signaling forwarded by a network side and transmitted by the target 5G base station to the network side.

11. The apparatus according to claim 8, wherein the processor configured to determine the target 5G base station is configured to:
    interact with a 5G base station through a base station interface between the NB-IOT base station and the 5G base station, and compare the second device information received by the 5G base station with the first device information; and
    determine a 5G base station corresponding to the second device information matching with the first device information as the target 5G base station.

12. The apparatus according to claim 8, wherein the processor configured to determine the target 5G base station is configured to:
    report the first device information to a network side, causing the network side to compare, after receiving the second device information reported by a 5G base station, the first device information with the second device information;
    receive a 5G base station identifier transmitted by the network side, wherein the 5G base station identifier is a base station identifier of the 5G base station corresponding to the second device information matching with the first device information; and
    determine a 5G base station indicated by the 5G base station identifier as the target 5G base station.

13. An apparatus for signaling transmission, applied to a 5G base station, comprising:
    a processor, and
    a memory configured to store instructions executable by the processor;
    wherein the processor is configured to:
    receive second device information transmitted by a terminal to the 5G base station, wherein the second device information is device information of an NB-IOT device to be controlled by the terminal;

determine, from a plurality of NB-IOT base stations an NB-IOT base station having first device information matched with the second device information, as a target NB-IOT base station, wherein the first device information is device information of and reported by an NB-IOT device upon accessing the target NB-IOT base station;

receive a control signaling reported by the terminal accessing the 5G base station for managing and controlling the NB-IOT device; and transmit the control signaling to the target NB-IOT base station, causing the target NB-IOT base station to forward the control signaling to the NB-IOT device, thereby causing the NB-IOT device to perform an operation corresponding to the control signaling; wherein the target NB-IOT base station is an NB-IOT base station accessed by the target NB-IOT device.

14. The apparatus according to claim 13, wherein the processor configured to transmit the control signaling to the target NB-IOT base station is configured to:

transmit the control signaling to the target NB-IOT base station through a base station interface between the 5G base station and the target NB-IOT base station.

15. The apparatus according to claim 13, wherein the processor is configured to transmit the control signaling to the target NB-IOT base station is configured to:

transmit the control signaling to a network side, causing the network side to forward the control signaling to the target NB-IOT base station.

16. The apparatus according to claim 13, wherein the processor configured to determine the target NB-IOT base station is configured to:

perform information interaction through a base station interface between the 5G base station and an NB-IOT base station, and compare the first device information received by the NB-IOT base station with the second device information; and determine an NB-IOT base station corresponding to the first device information matching with the second device information as the target NB-IOT base station.

17. The apparatus according to claim 13, wherein the processor configured to determine the target NB-IOT base station is configured to:

report the second device information to a network side, causing the network device to compare, after receiving first device information reported by the NB-IOT base station, the first device information with the second device information;

receive an NB-IOT base station identifier transmitted by the network side, wherein the NB-IOT base station identifier is a base station identifier of an NB-IOT base station corresponding to the first device information matching with the second device information; and determine the NB-IOT base station indicated by the NB-IOT base station identifier as the target NB-IOT base station.

* * * * *